United States Patent [19]

Bretz

[11] 4,305,855

[45] Dec. 15, 1981

[54] FLOW-MODIFYING AGENTS FOR PLASTIC MATERIALS

[75] Inventor: John Bretz, Parma, Ohio

[73] Assignee: The Lubrizol Corporation, Wickliffe, Ohio

[21] Appl. No.: 195,280

[22] Filed: Oct. 7, 1980

Related U.S. Application Data

[63] Continuation of Ser. No. 806,385, Jun. 14, 1977, abandoned.

[51] Int. Cl.³ .............................................. C08L 91/00
[52] U.S. Cl. ............................... 260/28.5 AS; 260/21; 260/23 AR; 260/30.6 R; 260/31.8 R; 260/31.8 PQ; 260/31.8 AN; 260/33.6 R; 260/33.6 AQ; 260/33.6 PQ; 260/33.6 UA
[58] Field of Search ............ 260/28.5 AS, 21, 23 AR, 260/33.6 R, 33.6 AQ, 33.6 PQ, 33.6 UA, 31.8 PQ, 31.8 R, 31.8 AN, 30.6 R

[56] References Cited

U.S. PATENT DOCUMENTS

| | | | |
|---|---|---|---|
| 3,177,164 | 4/1965 | Mills et al. | 260/2.5 |
| 3,242,079 | 3/1966 | McMillen | 252/33 |
| 3,384,586 | 5/1968 | McMillen | 252/33 |
| 3,453,124 | 7/1969 | Wurstner | 428/471 |
| 3,492,231 | 1/1970 | McMillen | 252/33 |
| 3,671,012 | 6/1972 | Scott et al. | 252/33.4 |
| 3,746,643 | 7/1973 | Rogers | 252/33 |
| 3,869,417 | 3/1975 | Ramsay | 260/28.5 |
| 3,980,598 | 9/1976 | Moorwessel et al. | 260/28.5 |
| 3,986,995 | 10/1976 | Yates et al. | 260/23 |

FOREIGN PATENT DOCUMENTS 1239860 7/1971 United Kingdom .

*Primary Examiner*—Melvyn I. Marquis
*Attorney, Agent, or Firm*—Ronald L. Lyons; William H. Pittman; John P. Ward

[57] ABSTRACT

Metal-containing organic flow-modifying agents comprising a major proportion of a non-Newtonian colloidal disperse system containing metal-containing particles, dispersing medium and an organic compound having both a hydrophobic and a polar substituent and a minor proportion of polymeric resin which is present as a random dispersion of particles in a non-solvated form are useful in modifying the flow properties of plastic materials. Specific examples of the disperse system are those comprising calcium carbonate particles dispersed in a mineral oil dispersing medium in the presence of a calcium petrosulfonate; an example of the resin is finely divided polyethylene. These agents are useful for modifying the flow properties of plastic materials such as filled asphalt systems.

10 Claims, No Drawings

FLOW-MODIFYING AGENTS FOR PLASTIC MATERIALS

This application is a continuation of copending application Ser. No. 806,385, filed June 14, 1977 and now abandoned.

FIELD OF THE INVENTION

This invention relates to metal-containing organic flow-modifying agents. More particularly it relates to flow-modifying agents containing colloidal disperse systems and non-solvated polymeric resin particles dispersed therein. Solid filled materials containing said flow-modifying agents, a solid plastic organic material and a filler are also within the scope of the invention.

PRIOR ART

U.S. Pat. No. 3,384,586 describes polymeric compositions comprising mixtures of a polymeric resin and a non-Newtonian colloidal disperse system such as used in the flow-modifying agents of this invention.

U.S. Pat. No. 3,869,417 describes asphalt compositions containing copolymers of ethylene and vinyl acetate in homogeneous blend.

U.S. Pat. No. 3,671,012 discloses lubricating grease and rust-inhibiting compositions which consist essentially of a non-volatile diluent oil, an oil-soluble dispersing agent, an alkaline earth metal carbonate, and a polymer such as polyethylene.

U.S. Pat. No. 3,986,995 describes friable compositions made from paraffin-hydrocarbon waxes, calcium hydroxide, and fatty acids. These compositions are useful as extrusion agents for thermoplastic polymer formulations.

U.S. Pat. No. 3,242,079 describes homogeneous grease compositions made from mineral oils and overbased sulfonic and carboxylic acid salts and their use as additives in asphalts and caulking compositions.

U.S. Pat. No. 3,980,598 describes mixtures of asphalt and ethylene copolymers and their fabrication into sheeting useful as roofing materials, container liners and pipe coatings.

U.S. Pat. No. 3,177,164 describes foam compositions made from mixtures of asphalt and ethylene/vinyl acetate copolymer resins.

BRIEF DESCRIPTION OF THE INVENTION

The metal-containing organic flow-modifying agents of the present invention comprise (A) a major proportion of at least one non-Newtonian colloidal disperse system comprising:

(1) Solid, metal-containing colloidal particles predispersed in (2) At least one liquid dispersing medium and (3) As an essential component, at least one organic compound which is soluble in said dispersing medium, the molecules of said organic compound being characterized by a hydrophobic portion and at least one polar substituent and (B) a minor proportion of at least one polymeric resin present in said non-Newtonian system as a random dispersion of finely divided, discrete particles in non-solvated form. Optionally, these agents can also include a minor proportion of (C) at least one substantially non-volatile, organic, liquid fluidizer.

This invention also includes a solid, filled material comprising: (I) a minor proportion of at least one solid plastic organic material, (II) a major proportion of a filler and (III) (A) a minor proportion of at least one non-Newtonian colloidal disperse system comprising:

(1) Solid, metal-containing colloidal particles predispersed in (2) At least one liquid dispersing medium and (3) As an essential component, at least one organic compound which is soluble in said dispersing medium, the molecules of said organic compound being characterized by a hydrophobic portion and at least one polar substituent and III (B) a minor portion of at least one polymeric resin present in said non-Newtonian system as a random dispersion of finely divided, discrete particles in non-solvated form are also within the scope of this invention. These solid, filled materials can also optionally contain a minor proportion of III (C) at least one substantially non-volatile, organic, liquid fluidizer.

DETAILED DESCRIPTION OF THE INVENTION

The non-Newtonian colloidal disperse systems used in the flow-modifying agents of this invention are well known to the art and are described, for example, in U.S. Pat. Nos. 3,492,231, 3,242,079, 3,027,325, 3,488,284, 3,372,114, 3,411,923, 3,372,115, 3,422,013, 3,350,308, 3,312,618, 3,376,222, 3,471,403, 3,453,124, 3,377,283, 3,595,790, 3,766,067, 3,766,066, 3,671,012 and 3,384,586. These patents are incorporated by reference for their disclosures relating to the nature and methods of preparing non-Newtonian colloidal disperse systems useful in the flow-modifying agents of the present invention.

In these disperse systems at least a portion of the particles dispersed therein are solid metal-containing particles formed in situ. The size of these particles is not critical as long as they are dispersed in the form, for example, of colloids or colloidal solutions. Ordinarily, the particles do not exceed 5000 angstroms in size. Generally, the maximum unit particle size is less than about 1000 angstroms, usually less than 400 angstroms. Disperse systems having unit particle size in the range of 30 angstroms to 200 angstroms has been found to give excellent results. The term "unit particle size" is defined in the above-noted '586 patent which is incorporated herein by reference for this definition.

The solid metal-containing particles are metal salts of inorganic acids and low molecular weight organic acids (such as formic, acetic and propionic acids), hydrates thereof, or mixtures of two or more of these. These salts are usually alkali and alkaline earth formates, acetates, carbonates, hydrogen carbonates, hydrogen sulfides, sulfides, sulfates, hydrogen sulfates and halides. Magnesium, calcium and barium salts are typical examples. Typically then the metal particles are solid metal-containing colloidal particles consisting essentially of alkaline earth metal salts, these salts being further characterized by having been formed in situ.

Colloidal disperse systems used in the agents of this invention also comprise at least one liquid dispersing medium. The identity of the medium is not a critical aspect of the invention as the medium serves primarily as a liquid vehicle in which the solid particles are dispersed. Normally it consists of one or more substantially inert, nonpolar organic liquids. That is, liquids which are substantially chemically inactive in the particular environment in question. The liquid dispersing medium may be substantially volatile or non-volatile at standard temperature and pressure. Often the non-Newtonian disperse system is prepared in such a manner that a mixture of such volatile and non-volatile organic liquids is used as the dispersing medium thus permitting easy removal of all or a portion of the volatile component by heating. This is an optional and often desirable means for controlling the viscosity or fluidity of the disperse system.

Typical dispersing mediums include the fluidizers which are described hereinafter as well as liquids such as mineral oils and synthetic oils. Other organic liquids such as ethers, alkanols, alkylene glycols, ketones, and the like are useful as dispersing mediums.

From the standpoint of availability, cost and performance, liquid hydrocarbons and particularly liquid petroleum fractions represent particularly useful disperse mediums. Included within these classes are benzene and alkylated benzene, naphthalene-based petroleum fractions, paraffin-based petroleum fractions, petroleum ether, petroleum naphthas, mineral oil, Stoddard Solvent, and mixtures thereof. Typically the disperse medium is mineral oil or at least about 25% of the total medium is mineral oil. Often at least about 50% of the dispersing medium is mineral oil. As noted, mineral oil can serve as the exclusive dispersing medium or it can be combined with some non-mineral oil organic liquid such as, for example, the fluidizers.

In addition, it is sometimes desirable to incorporate into the non-Newtonian colloidal disperse system one or more waxes as described in U.S. Pat. No. 3,746,643 and U.K. Pat. No. 1,239,860, both of which are expressly incorporated herein by reference for their description of suitable waxes and procedures for incorporating them into non-Newtonian colloidal disperse systems. The waxes may be natural, synthetic, amorphous, crystalline, non-crystalline, or a mixture of two or more of any of these. The amount of waxes, if any, incorporated in the disperse system will normally be within the ranges described in said patents.

In addition to the solid metal-containing particles and the dispersing medium, the non-Newtonian colloidal disperse system of this invention includes at least one organic compound which is soluble in the disperse medium and whose molecules are characterized by the presence of a hydrophobic portion and at least one polar substituent. While the types of suitable organic compounds are extremely diverse and include generally oil-soluble organic acids such as phosphorus acids, thiophosphorus acids, sulfur acids, carboxylic acids, thiocarboxylic acids and the like, as well as their corresponding alkali and alkaline earth salts, the alkaline earth and alkali metal salts of oil-soluble petrosulfonic acids, mono-, di- and tri-aliphatic hydrocarbon sulfonic acids and oil-soluble fatty acids, are, for reasons of economy, availability and performance particularly suitable. While the practice and description of this invention does not depend on any particular theory, it is believed that at least a portion of the organic compounds orient themselves along the external surface of the colloidal particles and thereby form micellar colloidal particles characterized by at least one metal-containing layer, at least one hydrophobic layer, and a polar layer bridging said metal-containing layer and said hydrophobic layer.

Broadly speaking, the non-Newtonian colloidal disperse systems used in the flow-modifying agents of the present invention are prepared by treating a single phase homogeneous Newtonian system of an overbased organic compound corresponding to one or more of the organic compounds described hereinabove with a conversion agent which is usually an active hydrogen-containing compound.

Typical active hydrogen-containing conversion agents include lower aliphatic carboxylic acids, water, aliphatic alcohols, alicyclic alcohols, phenols, ketones, aldehydes, amines, boron acids, and phosphorus acids. Oxygen, air and carbon dioxide can also be used as conversion agents. Often a mixture of water and alcohols (e.g., a lower alkanol) is used. Such mixtures usually have weight ratios of alcohol to water of from about 0.05:1 to about 24:1. Water and carbon dioxide mixtures are also very useful conversion agents.

The treating operation is simply a thorough mixing together of the two components, i.e., homogenization. This homogenization is generally achieved by vigorous agitation of the components at or near the reflux temperature of the mixture. Usually this temperature ranges from about 25°–200° C., typically it is no more than about 150° C. This treatment converts these single phase systems into non-Newtonian colloidal disperse systems. Suitable overbased materials are well known to the art and are disclosed in a large number of U.S. patents. Representative examples of these patents are disclosed in column 8 of the afore-mentioned '586 patent and this disclosure is hereby incorporated by reference. Further details as to the preparation of the non-Newtonian colloidal disperse systems are found in the above-noted U.S. Pat. Nos. 3,384,586, 3,242,079, 3,027,325, 3,488,284, 3,372,114, 3,411,923, 3,372,115, 3,422,013, 3,350,308, 3,312,618, 3,376,222, 3,471,403, 3,453,124, 3,377,283, 3,595,790, 3,766,067, 3,766,066, 3,671,012 and 3,492,231 which are hereby incorporated by reference for their disclosures relating to the preparation of non-Newtonian colloidal disperse systems.

The metal-containing organic flow-modifying agents of this invention also include a minor proportion (generally about 1 to about 35 parts by weight per 100 parts of non-Newtonian dispersion) of at least one polymeric resin. In the flow-modifying agent this resin is present in the non-Newtonian disperse system as a random dispersion of finely divided, discrete particles in non-solvated form. These finely divided, discrete particles typically have an average particle size of up to about 500 microns. Usually their average particle size is in the range of about 0.1–300 microns. (Average particle size by weight is that size which represents 50% of the samples weight on the weight-size distribution curve.)

The fact that the finely divided, discrete polymeric resin particles are present in non-solvated forms means they are not dissolved in, for example, the dispersing medium (or the fluidizing agent) present with them in the flow-modifying agent. This does not mean that the particles of resin are totally incapable of dissolving in one or more of the other components of the flow-modifying agents of this invention. They are often capable of so dissolving, particularly upon the application of heat. This dissolving or solvating manifests itself by a sudden increase in the flow-modifying agent viscosity which makes it, for practical purposes, much more difficult to pour and otherwise handle.

The polymeric resin will not significantly solvate in the flow-modifying agent at a temperature of less than about 70° C., typically at a temperature of less than about 100° C. Significant solvation of the resin in the flow-modifying agent manifests itself by an increase in viscosity of at least about 25% relative to its viscosity at 25° C. and is usually brought about by heating of the flow-modifying agent.

The polymeric resins useful in making the flow-modifying agents generally have a melting point in the temperature range of about 70°–200° C. They are generally substantially thermally stable at temperatures of up to about 250° C. This property allows them to be combined, for example, with plastic or resinous materials such as asphalt at elevated temperatures.

While many representative classes of polymeric resins are suitable for use in the flow-modifying agents, homo- and copolymers of at least one $C_{2-12}$ 1-monoolefin or 1-diolefin are, for reasons of availability, cost and performance, usually used. These polymers include polyethylene, polypropylene, ethylene/propylene copolymers, and ethylene/vinyl acetate polymers. Maleic anhydride/styrene copolymers, and alkaline earth metal salts thereof are also useful. Other polymers derived from, for example, vinyl chloride, $C_{1-18}$ alkanol esters of acrylic and methacrylic acids, acrylonitrile, 2-cyanoacrylic acid and the corresponding esters can also be used.

While a number of resins are useful in formulating the viscosity-modifying agents of the present invention, a particularly useful class has been found to be the Microthene F and Ultrathene resins marketed by U.S.I. Chemicals (a division of National Distillers and Chemical Corp.). These resins are made from high and low density polyethylene, polypropylene and ethylene vinyl acetate copolymers. Typically they have a melt index (grams/10 minutes) of about 25 to 5 and an average particle size of less than about 30 microns. They can be further characterized by having vicat softening point ranges as measured by ASTM D-129 58T of about 40°–160° C.

As noted above, the flow-modifying agents of this invention can contain at least one non-volatile organic liquid fluidizer. Description of this fluidizer as non-volatile means that it has a boiling point at 760 mm of at least about 200° C. This fluidizer can be the liquid dispersing medium used in the non-Newtonian colloidal disperse system, but more typically it is an additional material. Typically these fluidizers function to fluidize the flow-modifying agent and thus ease in its handling and use. They can also function as plasticizers for resinous compositions other than the afore-described polymeric resin particles. Typically, they are plasticizers for the solid, plastic organic materials described hereinafter. Many such plasticizers are known to the art, particularly the ester plasticizers. Typical ester plasticizers are chosen from the group consisting of phthalates, phosphates, adipates, azelates, oleates, and sebacates. Specific examples are the dialkyl phthalates such as di(2-ethylhexyl)phthalate, dibutyl phthalate, diethyl phthalate, dioctyl phthalate, butyl octyl phthalate, dicyclohexyl phthalate, butyl benzyl phthalate, diaryl phosphates such as tricresyl phosphate, triphenyl phosphate, cresyl diphenyl phosphate; trialkyl phosphates, such as trioctyl phosphate and tributyl phosphate; alkoxyalkyl phosphates such as tributoxyethyl phosphates; alkylaryl phosphates such as octylphenyl phosphate; alkyl adipate such as di(2-ethylhexyl)adipate, diisooctyl adipate, octyldecyl adipate; dialkyl sebacates such as dibutyl sebacate, dioctyl sebacate, diisooctyl sebacate; alkyl azelates such as di-2-ethylhexyl azelate and di(2-ethylbutyl)azelate and the like. Analogous esters can be made from citric and salicylic acids. Esters of monocarboxylic acids such as benzoic acid with, for example, diethylene glycol, dipropylene glycol, triethylene glycol, and the like are also useful as are toluene sulfonamides. Mixtures of two or more of the above plasticizers are also useful.

The preparation of the flow-modifying agents of this invention is carried out by conventional mixing techniques. No special precautions need be taken in combining the non-Newtonian dispersion, polymeric resin, and if present the fluidizer, except that the combination must be made in such a way as to avoid significant solvation of the resin particles. In other words, mixing must be accomplished so that the resin does not dissolve significantly in one or more of the other components of the flow-modifying agent. This is conveniently accomplished by mixing at low temperatures, such as 25 to 40° C. It is possible, and sometimes desirable, however, to add 30 or 50% of the total amount of the fluidizer in combination with the polymeric resin to the non-Newtonian colloidal disperse system which contains the rest of the fluidizer. After blending of these components, the remainder of the fluidizer is added. Typically, however, the total amount of the fluidizer is added directly to the non-Newtonian colloidal disperse system and then the resin particles are added and dispersed. This agent is typically an easily flowable material if the fluidizer is present.

As noted above, the flow-modifying agents of the present invention contain a major proportion of the non-Newtonian colloidal disperse system and a minor proportion of at least one polymeric resin. When the fluidizer is not used as the sole dispersing medium, it is present in a minor proportion also. Typically the flow-modifying agents contain about 95–55 weight percent non-Newtonian colloidal disperse system, about 0.5–20 weight percent polymeric resin as finally divided, randomly dispersed, discrete particles in non-solvated form, and when present, about 5–30 weight percent fluidizing agent.

The organic flow-modifying agents of the present invention are useful in modifying the properties of solid filled materials comprising (I) a minor proportion of at least one solid plastic organic material, (II) a major proportion of filler and, (III) a minor proportion of the afore-described flow-modifying agent. Since the flow-modifying agent can be formulated in situ in the solid filled material with the other components of the solid filled material, in its broadest aspect, the solid filled material can be described as comprising: (I) a minor proportion of at least one solid, plastic, organic material, (II) a major proportion of at least one filler and (III) (A) a minor proportion of at least one non-Newtonian colloidal disperse system comprising:

(1) Solid, metal-containing colloidal particles predispersed in (2) At least one liquid dispersing medium and (3) As an essential component, at least one organic compound which is soluble in said dispersing medium, the molecules of said organic compound being characterized by a hydrophobic portion and at least one polar substituent (III) (B) a minor portion of at least one polymeric resin, and optionally, a fluidizer (III) (C) which is a plasticizer for said plastic material. While components (III) (B) and (III) (C) can be added separately, the non-Newtonian colloidal disperse system (III) (A) must be preformed (by the techniques described hereinbefore) and then combined with the other components to make these solid filled materials.

Typically the solid plastic organic material is bitumen such as an asphalt although it can also be a resinous composition such as polypropylene, vinyl chloride or a polyester. When the solid organic material is an asphalt, it can be a straight reduced, thermal or air-blown asphalt. When the solid material is intended to be used as a coating (e.g., an underground pipe coating), or for the production of liners for water-containing reservoirs, or for fabricating insulation for use in automobiles, the asphalt is typically an air-blown asphalt. Such air-blown asphalts have a penetration value at 77° F. of 0–100 (50 gm weight) and a softening point (using the Ring and Ball method) of at least about 70° C.

Many types of materials suitable for use as fillers for solid plastic materials are known to those in the art. These filler materials are generally particulate solids and can be organic such as wood flower, rubber powder, wool felt, jute, synthetic fibers and slag wool. They can also be inorganic in nature as exemplified by silica, carbon black, infusorial earth, kaolin, clay, quartz powder, finely ground rock, sand, glass fibers and mineral materials such as the alkaline earth metal carbonates and sulfates, talc, and the like. The filler materials, particularly inorganic filler materials, may be used in their hydrated or non-hydrated forms. Mixtures of filler materials can also be used. Typical specific fillers are calcium, magnesium and barium carbonate in finely divided form capable of having at least 80% by weight pass through a 100 mesh screen.

For example, when the solid plastic material is an air-blown asphalt having a softening point of about 80° C., the filler material can be selected from the group consisting of magnesium carbonate, calcium carbonate, barium sulfate, in their hydrated of non-hydrated forms and mixtures of same. Such materials containing these fillers in combination with asphalt and the flow-modifying agents of the present invention are useful in fabricating insulation for use in automobiles and trucks. Such solid filled materials exhibit especially desirable properties of flow and sag which aid in the manufacture and installation of such pads. For example, they flow at moderately elevated temperatures (e.g., 135° C.) so to conform to the convexities and concavities of metal shaped parts which they adjoin and at higher temperatures, (e.g., 204° C.) retain their shape so as to not run off or sag significantly. The use of the flow-modifying agents of the present invention in such asphaltic filled materials allows the fabricator to avoid the use of asbestos fibers as flow modifiers. Previous to the invention of the present flow-modifying agents, such asbestos fiber-containing asphalt in compositions were commonly used to fabricate such insulation. Since asbestos has been found to be hazardous to health, avoidance of its use in this manner is therefore desirable.

While the afore-described solid plastic material, filler, non-Newtonian colloidal disperse system, polymeric resin and, optionally the fluidizer, can be combined in any sequence or simultaneously, it is usually desirable to first prepare the flow-modifying agent and then combine it simultaneously or in any sequence with the solid material and filler. This procedure allows the flow-modifying agent to be transported from the site of its manufacture to the site of its use and has proved an economical and efficient one. The flow-modifying agent can be incorporated into solid material often at an elevated temperature, for example, a temperature of about 200° C. when the solid material is an air-blown asphalt, and the resulting mixture then combined with the filler. Alternatively, the filler and solid material can be first combined at an elevated temperature (e.g., about 175–205° C.) and the resulting mixture then combined again at elevated temperatures with the flow-modifying agent. Typically, the filled solid made from the flow-modifying agents of the present invention is heated to a temperature of at least 70° C. Often this heating is continued until the polymeric resin particles are substantially solvated or dissolved in the system such as by heating at a temperature of at least about 85° C. and often to a temperature of up to about 300° C. The fluidizer when present can also function as a plasticizer for the solid plastic material.

The solid filled materials of the present invention are generally comprised of about 10–40 parts by weight of solid organic plastic material (I), about 85–60 parts by weight filler (II) and about 1–20 parts by weight of flow-modifying agent (III).

The following are specific examples of the flow-modifying agents of the present invention and their use in solid filled materials and include the best mode of practicing the invention presently known.

EXAMPLES

The following table shows some of the possible organic flow-modifying agents of this invention. These examples of organic flow-modifying agents are prepared by thoroughly mixing (A) a non-Newtonian colloidal disperse system made according to the procedure described in U.S. Pat. No. 3,492,231 by gelling in the presence of a water/alcohol mixture a basic, carbonated calcium petroleum sulfonate (approximate molecular weight of the free acid is 430) having a metal ratio of 1200 and a 50% mineral oil content. The basic calcium petroleum sulfonate is made according to the procedure described in U.S. Pat. No. 3,350,308 with (C) the specified organic fluidizer at 120°–130° C. The resulting intermediate is then thoroughly mixed with the specified polymeric resin (B) at 30° C. (The above-mentioned '308 and '231 U.S. patents are hereby expressly incorporated by reference for their disclosure of the preparation of the above-described compositions.)

| | ORGANIC FLOW-MODIFYING AGENT | | | | |
|---|---|---|---|---|---|
| | (A) Parts by weight of the non-Newtonian Colloidal | (B) | | (C) Organic | |
| Example | Disperse System | Polymeric Resin | (Parts by Wt.) | Fluidizer | (Parts by Weight) |
| 1 | 8,375 | Microthene F* | (500) | Di(2-ethylhexyl)-phthalate | (1,125) |
| 2 | 6,750 | Microthene F* | (1,000) | Di(2-ethylhexyl)-phthalate | (2,250) |
| 3 | 3,350 | Ultrathene** | (35) | Di-ethyl phthalate | (500) |
| 4 | 2,200 | Ethylene/Propylene (6/1)m copolymer having an average particle size of | (550) | Di-octyl adipate | (1,150) |

-continued

ORGANIC FLOW-MODIFYING AGENT

| Example | (A) Parts by weight of the non-Newtonian Colloidal Disperse System | (B) Polymeric Resin | (Parts by Wt.) | (C) Organic Fluidizer | (Parts by Weight) |
|---|---|---|---|---|---|
| 5 | 7,650 | 50 microns Microthene F* | (750) | Tri-cresyl phosphate | (1,600) |
| 6 | 9,500 | Microthene F* | (500) | None | |
| 7 | 7,125 | Microthene F* | (500) | Di-(2-ethylhexyl)-phthalate | (2,375) |

*A polymer having spherical particles of an average size of 8 to 30 microns made from low density polyethylene sold by U.S.I. Chemicals (a division of National Distillers and Chemical Corp.)
**A powder similar to Microthene F made from ethylene/vinyl acetate copolymer.

The following table describes some of the possible solid filled materials of this invention. These materials are prepared by thoroughly mixing (I) an air-blown asphalt having a softening point of 80° C. as determined by the Ring and Ball method, (II) the specified filler and (III) the specified organic flow-modifying agent at 250° C.

SOLID FILLED MATERIALS

| Example | Parts by Weight Asphalt (I) | Filler (II) | (Parts by Weight) | Organic Flow-Modifying Agent (III) | (Parts by Weight) |
|---|---|---|---|---|---|
| 8 | 236 | CaCO$_3$/MgCO$_3$* | (1,185) | Example 1 | (79) |
| 9 | 272 | CaCO$_3$/MgCO$_3$* | (1,360) | Example 2 | (68) |
| 10 | 240 | Talc | (900) | Example 3 | (60) |
| 11 | 50 | BaSO$_4$ | (850) | Example 4 | (100) |
| 12 | 300 | Ground Glass | (650) | Example 6 | (50) |
| 13 | 236 | CaCO$_3$/MgCO$_3$* | (1,185) | Example 7 | (79) |

*97.8% Passes 100 mesh screen.

This invention having thus been described, what is claimed is:

1. A solid filled material comprising (I) a minor proportion of an asphalt, (II) a major proportion of a filler and (III) (A) a minor proportion of at least one non-Newtonian colloidal disperse system comprising:
   (1) Solid, metal-containing colloidal particles predispersed in
   (2) At least one liquid dispersing medium and
   (3) As an essential component, at least one organic compound which is soluble in said dispersing medium, the molecules of said organic compound being characterized by a hydrophobic portion and at least one polar substituent.
and (III) (B) a minor portion of at least one polymeric resin present in said non-Newtonian system as a dispersion of discrete particles in non-solvated form.

2. A material as claimed in claim 1 containing a (III) (C) fluidizer for said asphalt.

3. A material as claimed in claim 2 wherein components (I), (II), (III)(A), (III)(B) and (III)(C) are combined simultaneously or sequentially in any squence.

4. A material as claimed in claim 3 wherein components (III)(A), (III)(B) and (III)(C) are first combined in any sequence and then combined with components (I) and (II) in any sequence or simultaneously.

5. A material as claimed in claim 4 wherein (II) is at least one inorganic filler, (III) (B) is a hydrocarbon polymer of ethylene, propylene or ethylene/propylene and (III) (C) is a plasticizer for (I).

6. A material as claimed in claim 5 wherein the asphalt (I) is an air blown asphalt having a softening point of at least about 80° C. as measured by the ring and ball method, (II) is selected from the group consisting of alkaline earth metal carbonates and sulfates, talc, clay, ground glass, silica, carbon black, in their hydrated or non-hydrated forms and mixtures of same.

7. A material as claimed in claim 6 comprised of about 10–40 parts by weight (I), about 85–60 parts by weight (II) and about 1–20 parts by weight (III).

8. A composition made by heating the material of claim 1 to at least about 70° C.

9. A composition made by heating the material of claim 5 to at least about 70° C.

10. A composition made by heating the material of claim 7 to at least about 70° C.

* * * * *